Sept. 13, 1932.  C. D. RYAN  1,877,694
CLUTCH MECHANISM
Filed Feb. 18, 1929
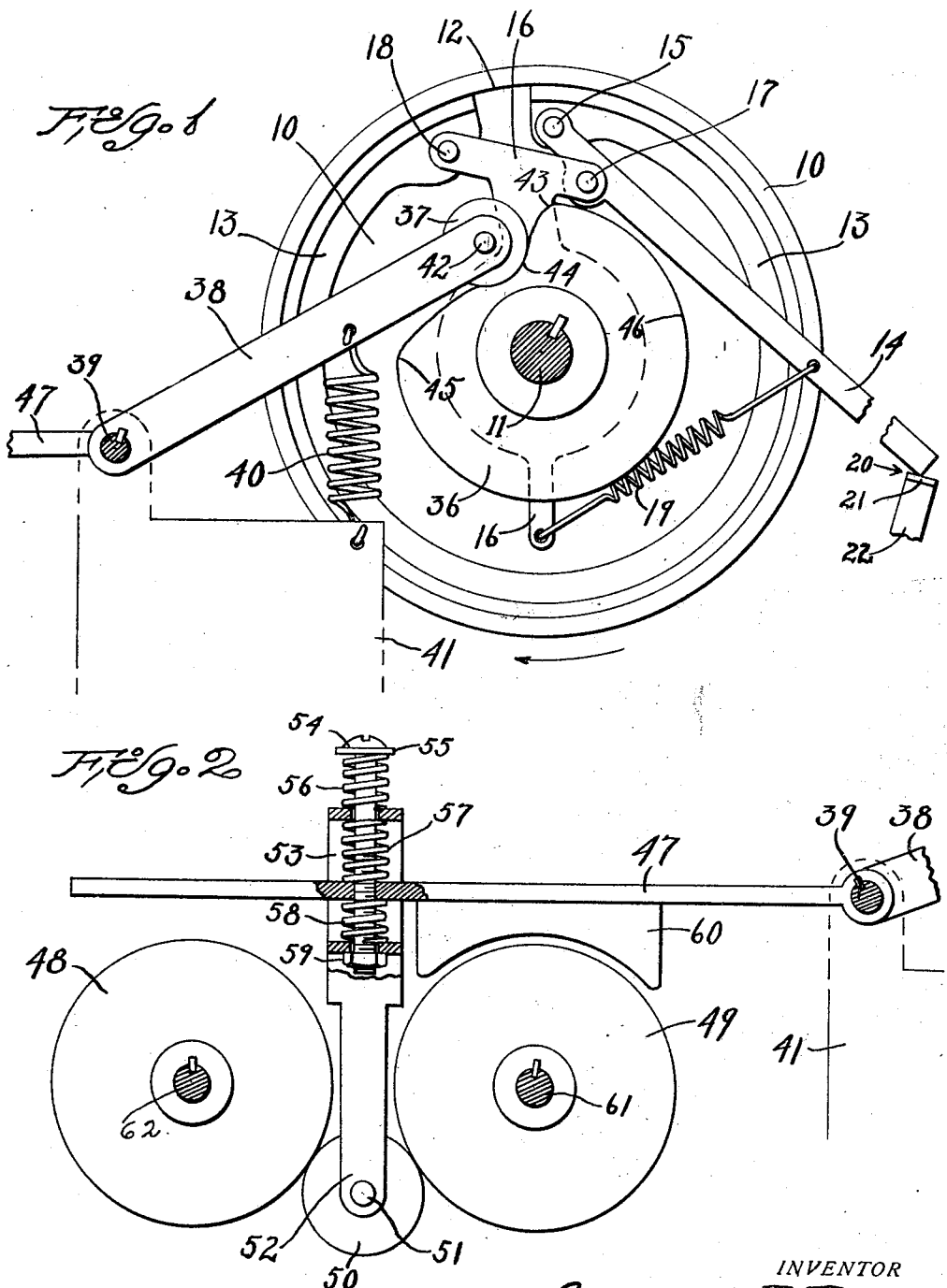
INVENTOR
BY COMMODORE D. RYAN,
R. Georg Orwig ATTORNEY Patented Sept. 13, 1932

1,877,694

UNITED STATES PATENT OFFICE

COMMODORE D. RYAN, OF LOS ANGELES, CALIFORNIA, ASSIGNOR, BY MESNE ASSIGN-MENTS, TO RALPH G. WHITLOCK PATENTS, INC., A CORPORATION OF NEVADA

CLUTCH MECHANISM

Application filed February 18, 1929. Serial No. 340,945.

This invention relates to a clutch mechanism in which a driven element is related to a driving element, connected with power, by means providing variable speeds of the driven element whereby movements of the driven element may be synchronized with the movements of a primary controlling clutch.

Objects of my invention are—

To provide in mail marking machines a clutch control of relatively compact construction, light of weight, simplicity of parts and economy of construction, to be actuated by a very light contact by a trip mechanism; to provide a means for instant and positive clutch actuation and release, to provide means for positive positioning of the control arm in relation to the trip upon the completion of each cycle of the clutch.

A further object of my invention is to provide means for automatically completing a cycle of the clutch and the positive positioning of the same, at the completion of every cycle of its operation, at a predetermined point, by the simplest and most effective construction.

And a further object of my invention is to provide a positive means of simple construction for the control and operation of a secondary clutch, designed to control movement of a driven apparatus, such as a conveyor and feeder and moistener mechanism of a postal machine in which intermittent movement of the recited parts is required.

To the above purposes my invention consists in the novel construction, arrangement and combination of parts as hereinafter fully, clearly and concisely described, definitely pointed out in my claims and illustrated by the accompanying drawing (1 sheet) in which—

Fig. 1 is an end elevation of the clutch and the control mechanism.

Fig. 2 is an end elevation partly in section of the secondary clutch.

The control movements of the clutch originate thru arm 14 at contact 20, when arm 22 is actuated by a trip, not shown, and contact face 21 is removed from contact point 20, allowing free movement of arm 14.

Pulley wheel, or clutch element, 10 is a driving member with an inner face 12 against which is frictionally engaged clutch member 13 supported and actuated for engagement and disengagement by clutch carriage 16 pivotally connected by pin 18 to clutch member 13, and further pivotally connected by pin 17 to arm 14 and the latter by pin 15 to clutch member 13.

Clutch carriage 16 is key related to shaft 11, which is, or may be, connected to a postal indicia printing press, and the opposite portion of carriage 16 is shaped to secure one end of a tension spring 19 connected to arm 14, which functions upon the release of arm 21, thru arm 14 to expand clutch member 13 to engagement with face 12.

Upon the completion of a cycle of operation of the clutch the contact face 21 of arm 22 having been returned to contact position 20 in the path of the rotation of arm 14, acts to stop arm 14 upon contact, thus contracting the clutch member 13 and removing it from contact with face 12.

To complete the cycle of movement to positive predetermined point of rest (required for the efficient successive operations of a printing press which may be driven by shaft 11) there is provided a cam 36, key related to shaft 11, which cam 36 has a face 46, a certain length of which as at 43 presents to the roller 37 an angularity of contact forming a lever upon the shaft 11, which with the power derived from a sufficiently powerful spring such as 40, acting thru arm 38, rotatively carrying roller 37, by means of pin 42, functions to further rotate and complete the cycle of operation of the cam and clutch parts by pressure upon the angular cam face 43, and as cam 36 rotates, roller 37 functions to seat in dwell 44, and this positioning together with the contact as described at point 20 locks the cam clutch in a positive predetermined point against further operation until released by operation of arm 21 to that end.

Cam 36 has a length of its face 46 designed to operate as an eccentric lifting cam surface 45, which upon the rotation of cam 36 lifts roller 37 and arm 38 to the face 46 at which elevation they remain during the rotation of the length of cam face 46, and this movement of the arm 38 which is key related to a shaft 39 rotates shaft 39 having key related to it a secondary clutch arm 47 carrying brake 60, clutch carriage 53, adjustable riding pin 54, washer 55, riding springs 56, 57, 58 secured by nut 59, the lower section of carriage 53 being a bearing 52 for pin 51 and friction clutch roller 50 operating between a power driven friction drum 48, key related to a power driven shaft 62 and a drum 49 to which it conveys the said power upon engagement, said drum 49 thru its key related shaft 61 may operate connected mechanism, such as a postal machine conveyor and feeder which requires the intermittent movement hereby delivered.

Roller arm 38 being continuously spring tensioned by spring 40 against the face 46 of cam 36, closely following the various contours, as recited, functions during a cycle of the clutch, first, to operate the secondary clutch to disengage the friction clutch roller 50 and apply the brake 60; second, to hold that relation throughout the travel of the cam face 46; third, to complete the cycle of the cam and clutch to a predetermined point of stoppage thru its action on cam face 43, fourth, upon the return of the roller 37 to the dwell 44 and the consequent movement of the connecting parts, disengages, brake 60 and engages clutch roller 50 of the secondary clutch; fifth, to act to maintain the point of contact at 20 for a release movement by arm 22; sixth, acts for a full contraction of clutch member 13, thus disengaging it from face 12, and seventh when roller 37 seats in dwell 44 and with arm 14 contacting arm 22 at point 20, acts to lock the entire clutch mechanism against movement in either direction until released by arm 22 at point 20.

The cam 36, roller 37, arm 38 of the primary clutch, being key related to the arm 47 of the secondary clutch provide positive movements of the roller 50 and brake 60. A more or less variable, or yieldable relating of the roller 50 and brake 60 with the drums 48 and 49 is provided by the balanced springs 57 and 58. The variably tensioned spring 56 provides adjustment of the carriage 53 of the secondary clutch relative to the tensioned arm 38 of the primary clutch in order to effect proper position relation of the roller 50 with possible variable positions of the arm 38.

Thus I have provided in my invention a simple and efficient mechanism for furnishing intermittent power supply, as controlled by two clutches. With a source of power supply driving pulley 10 of the clutch and the same source of power driving drum 48 of the secondary clutch thru its key related shaft 62, with the secondary clutch normally engaged, so as to drive the conveyor of a postal machine which may be connected to shaft 61, and with a postal printing press which may be connected to shaft 11, which together with the cam 36, clutch member 13, and its connecting parts are normally at rest, actuation by a mail piece being conveyed by a conveyor to engage a trip may actuate arm 22 and trip the clutch mechanism, starting the rotation of the clutch and its connections to rotate once only, and co-acting to stop the secondary clutch and its connections while a printing press is being operated and to stop the press after the recited cycle, and start the said conveyor mechanism, operating same continuously until acted upon by another envelope to actuate the said clutches, and furnishing an intermittent power supply alternately to a printing press and to a conveyor, controlled by the mail pieces being conveyed thereon.

The form of the device illustrated and described herein is submitted in accordance with statutory requirement by way of exhibiting one form of embodiment of my invention. Various changes, alterations or modifications of the structure may be made without departure from my invention as defined in the following claims.

I claim:

1. A clutch mechanism comprising: a driving roller; a driven roller; a clutch arm; a brake mounted on said clutch arm and positioned for engagement with said driven roller; and a friction roller yieldably mounted on said clutch arm so as to be brought into contact with said driving roller and said driven roller when said arm is moved away from said driven roller.

2. A combination as in claim 1 in which said friction roller is mounted on a carriage which embraces said clutch arm and has an opening bounded by end walls, said clutch arm extending through said opening, there being suitable apertures in said end walls and in said arm, the apertures in said arm being threaded; a threaded mounting stem adapted to be inserted through the holes in said carriage end walls and screwed into the aperture in said clutch arm; and springs disposed about said stem between said arm and said end walls, the position of said carriage on said clutch arm being yieldably adjustable by screwing said stem in said threaded aperture.

3. A combination as in claim 1 in which said friction roller is mounted on a carriage which embraces said clutch arm and has an opening bounded by end walls, said clutch arm extending through said opening, there being suitable apertures in said end walls and in said arm, the aperture in said arm being threaded; a threaded mounting stem adapted to be inserted through the holes in said carriage end walls and screwed into the aperture in said clutch arm; a head on one end of said stem and a nut on the other end of said stem; compression springs between said clutch arm and said carriage end walls;

and a compression spring between the stem head and adjacent one of said end walls, the position of said carriage on said clutch arm being yieldably adjustable by screwing said stem in said threaded aperture.

4. A combination as in claim 1 in which said friction roller is mounted on a yoke which is adjustably and yieldably connected to the clutch arm and extends between said drive and said driven rollers so that the friction roller is mounted on the yoke on the opposite side of said drive and driven rollers from said arm.

5. A combination as in claim 1 in which said friction roller is mounted on a yoke which is adjustably and yieldably connected to the clutch arm and extends between said drive and said driven rollers so that the friction roller is mounted on the yoke on the opposite side of said drive and driven rollers from said arm and in which said clutch arm is substantially horizontally disposed and said yoke extends downwardly therefrom.

In testimony whereof, I hereunto affix my signature this 5th day of February, 1929.

COMMODORE D. RYAN.